(12) United States Patent
Kim

(10) Patent No.: US 9,075,793 B2
(45) Date of Patent: Jul. 7, 2015

(54) SYSTEM AND METHOD OF PROVIDING AUTOCOMPLETE RECOMMENDED WORD WHICH INTEROPERATE WITH PLURALITY OF LANGUAGES

(75) Inventor: Tae-il Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 1264 days.

(21) Appl. No.: 11/586,396

(22) Filed: Oct. 25, 2006

(65) Prior Publication Data

US 2007/0100890 A1    May 3, 2007

(30) Foreign Application Priority Data

Oct. 26, 2005 (KR) .................. 10-2005-0101532

(51) Int. Cl.
| | | |
|---|---|---|
| *G06F 17/30* | (2006.01) | |
| *G06F 17/27* | (2006.01) | |
| *G06F 3/01* | (2006.01) | |
| *G06F 3/023* | (2006.01) | |
| *G06F 17/28* | (2006.01) | |

(52) U.S. Cl.
CPC ........ *G06F 17/276* (2013.01); *G06F 17/30979* (2013.01); *G06F 17/30929* (2013.01); *G06F 17/30834* (2013.01); *G06F 17/3043* (2013.01); *G06F 17/30946* (2013.01); *G06F 17/30716* (2013.01); *G06F 17/30401* (2013.01); *G06F 3/018* (2013.01); *G06F 3/0237* (2013.01); *G06F 17/2755* (2013.01); *G06F 17/2863* (2013.01)

(58) Field of Classification Search
CPC ..... G06F 3/0235; G06F 3/0233; G06F 3/018; G06F 3/0236; G06F 17/2863; G06F 17/2755; G06F 17/0237; G06F 17/30716; G06F 17/30946; G06F 17/3043; G10L 13/08

USPC ......... 707/1, 3–6, 100, 102, 104.1, 200, 696, 707/705–711, 741–746, 753, 767, 772; 715/968, 263–265, 703, 236; 704/1–10, 235; 706/45–50; 434/167, 434/156–160

See application file for complete search history.

(56) References Cited

U.S. PATENT DOCUMENTS

| | | | | |
|---|---|---|---|---|
| 4,703,425 | A | * | 10/1987 | Muraki .............................. 704/7 |
| 5,289,375 | A | * | 2/1994 | Fukumochi et al. .............. 704/2 |
| 5,815,639 | A | * | 9/1998 | Bennett et al. ................ 704/235 |
| 5,890,183 | A | * | 3/1999 | Fujimoto ...................... 715/236 |

(Continued)

FOREIGN PATENT DOCUMENTS

| | | |
|---|---|---|
| JP | 08-339376 | 12/1996 |
| JP | 2002-091965 | 3/2002 |
| WO | WO 2004/066600 | * 8/2004 |

OTHER PUBLICATIONS

Prasad Pingali et al. "WebKhoj: indian language IR from multiple character encodings", WWW 2006, 9 pages.*

*Primary Examiner* — Srirama Channavajjala
(74) *Attorney, Agent, or Firm* — Greer Burns & Crain Ltd.

(57) ABSTRACT

A system and method of providing an autocomplete recommended word, which classify a recommended word list according to indexes of various languages, store the recommended word list for each index, extract a corresponding autocomplete recommended word according to a user query and a setting mode which is received from a user's web browser, provide the user with the corresponding autocomplete recommended word, and thereby may propose a suitable recommended word according to the user query.

25 Claims, 19 Drawing Sheets

(56) References Cited

U.S. PATENT DOCUMENTS

| | | | | |
|---|---|---|---|---|
| 6,092,035 | A * | 7/2000 | Kurachi et al. | 704/3 |
| 6,349,276 | B1 * | 2/2002 | McCarley | 704/8 |
| 6,604,101 | B1 * | 8/2003 | Chan et al. | 707/4 |
| 6,810,374 | B2 * | 10/2004 | Kang | 704/2 |
| 6,848,080 | B1 * | 1/2005 | Lee et al. | 715/203 |
| 7,080,002 | B1 * | 7/2006 | Kim | 704/2 |
| 7,146,358 | B1 * | 12/2006 | Gravano et al. | 707/4 |
| 7,177,794 | B2 * | 2/2007 | Mani et al. | 704/8 |
| 7,249,013 | B2 * | 7/2007 | Al-Onaizan et al. | 704/9 |
| 2001/0029455 | A1 * | 10/2001 | Chin et al. | 704/277 |
| 2002/0083029 | A1 * | 6/2002 | Chun et al. | 706/45 |
| 2003/0023420 | A1 * | 1/2003 | Goodman | 704/1 |
| 2003/0135357 | A1 * | 7/2003 | Abir | 704/2 |
| 2004/0205671 | A1 * | 10/2004 | Sukehiro et al. | 715/532 |
| 2005/0222838 | A1 * | 10/2005 | Gong | 704/5 |
| 2006/0206304 | A1 * | 9/2006 | Liu | 704/2 |
| 2006/0229865 | A1 * | 10/2006 | Carlgren et al. | 704/8 |
| 2007/0050352 | A1 * | 3/2007 | Kim | 707/4 |
| 2007/0110222 | A1 * | 5/2007 | Kim | 379/355.07 |

* cited by examiner

FIG. 4

| SEARCH STRING | RECOMMENDED WORD LIST |
|---|---|
| 소 | 소개 |
|   | 소녀 |
|   | ... |
| so | social |
|   | society |
|   | ... |
| そ | そう |
|   | そうして |
|   | ... |

FIG. 5

| SEARCH STRING | RECOMMENDED WORD LIST |
|---|---|
| 소 | 동사무소 |
| | 청소 |
| | ... |
| so | also |
| | espresso |
| | ... |
| そ | うそ |
| | ようこそ |
| | ... |

FIG. 6

| SEARCH STRING | RECOMMENDED WORD LIST | CONVERTED WORD FOR INDEXING |
|---|---|---|
| 소 | そう | 소우 |
| | そうして | 소우시테 |
| | ... | ... |

FIG. 7

| SEARCH STRING | RECOMMENDED WORD LIST | CONVERTED WORD FOR INDEXING |
|---|---|---|
| 소 | うそ | 우소 |
| | ようこそ | 요우코소 |
| | ... | ... |

FIG. 8

| SEARCH STRING | RECOMMENDED WORD LIST | CONVERTED WORD FOR INDEXING |
|---|---|---|
| so | そう | sou |
| | そうして | soushite |
| | ... | ... |

FIG. 9

| SEARCH STRING | RECOMMENDED WORD LIST | CONVERTED WORD FOR INDEXING |
|---|---|---|
| so | うそ | uso |
| | ようこそ | youkoso |
| | ... | ... |

FIG. 10

| RECOMMENDED MODE | MODE | INPUT | RECOMMENDED WORD |
|---|---|---|---|
| FIRST RECOMMENDED MODE | MODE 1 (PREFIX INDEX OF CONSONANT/VOWEL UNIT) | KOREAN | KOREAN CONSONANT/VOWEL PREFIX |
| | MODE 2 (PREFIX INDEX OF SYLLABLE UNIT) | KOREAN | KOREAN SYLLABLE PREFIX |
| | | ENGLISH | ENGLISH SYLLABLE PREFIX |
| | | JAPANESE | JAPANESE SYLLABLE PREFIX |
| | MODE 3 (SUFFIX INDEX OF SYLLABLE UNIT) | KOREAN | KOREAN SYLLABLE SUFFIX |
| | | ENGLISH | ENGLISH SYLLABLE SUFFIX |
| | | JAPANESE | JAPANESE SYLLABLE SUFFIX |
| SECOND RECOMMENDED MODE | MODE 4 | KOREAN | JAPANESE PREFIX |
| | MODE 5 | KOREAN | JAPANESE SUFFIX |
| | MODE 6 | ENGLISH | JAPANESE PREFIX |
| | MODE 7 | ENGLISH | JAPANESE SUFFIX |
| THIRD RECOMMENDED MODE | MODE 8 | KOREAN | KOREAN PREFIX + JAPANESE PREFIX |
| | MODE 9 | KOREAN | KOREAN SUFFIX + JAPANESE SUFFIX |
| | MODE 10 | ENGLISH | ENGLISH PREFIX + JAPANESE PREFIX |
| | MODE 11 | ENGLISH | ENGLISH SUFFIX + JAPANESE SUFFIX |

FIG. 11

| RECOMMENDED MODE | MODE | INPUT | RECOMMENDED WORD | INDEXER MODULE |
|---|---|---|---|---|
| FIRST RECOMMENDED MODE | MODE 1 | KOREAN | KOREAN CONSONANT /VOWEL PREFIX | CONSONANT/VOWEL PREFIX INDEXER MODULE |
| | MODE 2 | KOREAN | KOREAN SYLLABLE PREFIX | SYLLABLE PREFIX INDEXER MODULE |
| | MODE 3 | KOREAN | KOREAN SYLLABLE SUFFIX | SYLLABLE SUFFIX INDEXER MODULE |
| | MODE 2 | ENGLISH | ENGLISH SYLLABLE PREFIX | SYLLABLE PREFIX INDEXER MODULE |
| | MODE 3 | ENGLISH | ENGLISH SYLLABLE SUFFIX | SYLLABLE SUFFIX INDEXER MODULE |
| | MODE 2 | JAPANESE | JAPANESE SYLLABLE PREFIX | SYLLABLE PREFIX INDEXER MODULE |
| | MODE 3 | JAPANESE | JAPANESE SYLLABLE SUFFIX | SYLLABLE SUFFIX INDEXER MODULE |
| SECOND RECOMMENDED MODE | MODE 4 | KOREAN | JAPANESE PREFIX | KOREAN-JAPANESE PREFIX INDEXER MODULE |
| | MODE 5 | KOREAN | JAPANESE SUFFIX | KOREAN-JAPANESE SUFFIX INDEXER MODULE |
| | MODE 6 | ENGLISH | JAPANESE PREFIX | ENGLISH-JAPANESE PREFIX INDEXER MODULE |
| | MODE 7 | ENGLISH | JAPANESE SUFFIX | ENGLISH-JAPANESE SUFFIX INDEXER MODULE |
| THIRD RECOMMENDED MODE | MODE 8 | KOREAN | KOREAN PREFIX + JAPANESE PREFIX | KOREAN CONSONANT/VOWEL OR SYLLABLE PREFIX INDEXER MODULE & KOREAN-JAPANESE PREFIX INDEXER MODULE |
| | MODE 9 | KOREAN | KOREAN SUFFIX + JAPANESE SUFFIX | KOREAN SYLLABLE SUFFIX INDEXER MODULE & KOREAN-JAPANESE SUFFIX INDEXER MODULE |
| | MODE 10 | ENGLISH | ENGLISH PREFIX + JAPANESE PREFIX | ENGLISH SYLLABLE PREFIX INDEXER MODULE & ENGLISH-JAPANESE PREFIX INDEXER MODULE |
| | MODE 11 | ENGLISH | ENGLISH SUFFIX + JAPANESE SUFFIX | ENGLISH SYLLABLE SUFFIX INDEXER MODULE & ENGLISH-JAPANESE SUFFIX INDEXER MODULE |

FIG. 19

```
so
いっそ
うそ
おそ
およそ
かあうそ
proviso
so
soso
torso
virtuoso
```

US 9,075,793 B2

SYSTEM AND METHOD OF PROVIDING AUTOCOMPLETE RECOMMENDED WORD WHICH INTEROPERATE WITH PLURALITY OF LANGUAGES

CROSS-REFERENCE TO RELATED APPLICATION

This application claims the benefit of Korean Patent Application No. 10-2005-0101532, filed on Oct. 26, 2005, in the Korean Intellectual Property Office, the disclosure of which is incorporated herein by reference.

BACKGROUND OF THE INVENTION

1. Field of the Invention

The present invention relates to a system and method of providing an autocomplete recommended word, and more particularly, to a system and method of providing an autocomplete recommended word, which classify a recommended word list.

2. Description of Related Art

When a query is inputted from a user, a search website, which provides a search service, generally provides search results corresponding to the query, for example, web sites including the query, articles including the query, and images including the query as a file name.

Search services are currently being improved to increase users' conveniences. Accordingly, when a user inputs an appropriate query, the search service must provide satisfactory search results. Also, even when the user inputs an inappropriate query, the search service must provide appropriate search results which can satisfy the user. Specifically, as users of search service are being expanded and also users who do not have enough background knowledge about appropriate queries increase, it is required to guide the users to make an appropriate query.

Also, when the user desires to input a foreign language into a search window, the way that the foreign language is inputted to provide the user with an appropriate search result is also considered important. As an example, when the foreign language is Japanese or Chinese, which is not supported by a Korean keyboard, two conventional arts exist, i.e. 1) a method of inputting a foreign language into a search window with a click of a user's mouse through a foreign language input tool which is provided in a search service screen, and 2) a method of inputting a foreign language through software with multilingual input functionality.

However, in the method 1) according to the conventional art, for example, when a Japanese phrase such as 'そうして' is inputted, a user requires to click a user's mouse four times in order to input the hiragana. Also, since the method 1) according to the conventional art is based on a mouse click, an input speed of the method 1) according to the conventional art is slower than an input speed by a general keyboard. When the user remembers only a portion of a word, the user may not correctly input the word into the search window in the method 1) according to the conventional art. Moreover, in the method 1) according to the conventional art, an intention of a query of another user may not be ascertained.

Also, in the method 2) according to the another conventional art, a corresponding foreign language may be inputted only when the software with the multilingual input functionality, such as Microsoft Global Input Method Editors (MS IME), is installed in a user terminal. For example, when Japanese 'そうして' is inputted, a user requires to input as many as 8 characters corresponding to a Japanese pronunciation, 'soushite', or input 8 Korean characters corresponding to the Japanese pronunciation, '소우시테', through a keyboard. Also, when the user remembers only a portion of a word, the user may not correctly input the word into the search window in the method 2) according to the conventional art, and an intention of a query of another user may not be ascertained.

Thus, in order to improve a search service with respect to a foreign language input, a brand-new technology which may prevent a typographical error occurring when inputting a query in a foreign language, classify a recommended word list for each index based on a variety of standards, and automatically complete the query with respect to the foreign language desired to be inputted by a user according to a user input query and a setting mode which are received from a user's web browser, is required.

BRIEF SUMMARY

The present invention provides a system and method of providing an autocomplete recommended word which may propose a suitable recommended word according to a query which is inputted by a user in real time.

The present invention also provides a system and method of providing an autocomplete recommended word which may prevent a typographical error, and enable a user to accurately input a query.

The present invention also provides a system and method of providing an autocomplete recommended word which, while inputting a query in a second language, may select a desired recommended word of a first language and easily complete the query, by providing an autocomplete recommended word list which may classify the recommended word list for each index based on a variety of standards, and automatically complete the recommended word of the first language which is desired to be inputted by a user from the query of the second language which is received from a user's web browser.

The present invention also provides a system and method of providing an autocomplete recommended word which may provide an autocomplete recommended word in a foreign language by using a prefix as well as a suffix.

The present invention also provides a system and method of providing an autocomplete recommended word which may effectively classify a recommended word list for each index based on a variety of standards, extract the autocomplete recommended word with respect to a query which is being inputted by a user in real time, and thereby may notably reduce a loss of time and a financial loss which are caused by separately inputting a converted list or the recommended word list.

The present invention also provides a system and method of providing an autocomplete recommended word which automatically complete a recommended word, reduce an amount of time for inputting a query, and thereby may provide convenience to both a user and a user who is unfamiliar with a foreign language keyboard or a mouse.

The present invention also provides a system and method of providing an autocomplete recommended word which may help a user who remembers only a portion of a pronunciation of a query.

The present invention also provides a system and method of providing an autocomplete recommended word which may ascertain an intention of a query of another user with respect to a user input query.

According to an aspect of the present invention, there is provided a system for providing an autocomplete recommended word, the system including: a recommended word database storing and maintaining a recommended word list; a recommended word indexer module converting the recommended word list of a first language which is stored in the recommended word database to a converted word for indexing of a second language which is associated with the first language, and indexing the converted word for indexing according to any one of a consonant/vowel unit and a syllable unit; a recommended word index database storing the converted word for indexing and the recommended word list of the first language which corresponds to the converted word for indexing for each of any one of consonant/vowel unit index and syllable unit index; and a query autocompletion server receiving a query of the second language from a predetermined web server, extracting an autocomplete recommended word of the first language which is associated with the query of the second language from the recommended word index database, and transmitting the autocomplete recommended word of the first language to the web server.

According to another aspect of the present invention, there is provided a method of providing an autocomplete recommended word, the method including: storing and maintaining a recommended word list in a predetermined recommended word database; converting a recommended word list of a first language which is stored in the recommended word database to a converted word for indexing of a second language which is associated with the first language, and indexing the converted word for indexing according to any one of a consonant/vowel unit and a syllable unit; storing the converted word for indexing and the recommended word list of the first language which corresponds to the converted word for indexing for each of any one of the consonant/vowel unit and the syllable unit in a predetermined recommended word index database; and receiving a query of the second language and a setting mode from a user's predetermined web server, extracting an autocomplete recommended word of the first language which is associated with the query of the second language from the recommended word index database, and transmitting the autocomplete recommended word of the first language to the web browser.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 4 is a diagram illustrating an example of a search string and a recommended word list sorted by a prefix index of a syllable unit according to an embodiment of the present invention;

FIG. 5 is a diagram illustrating an example of a search string and a recommended word list sorted by a suffix index of a syllable unit according to an embodiment of the present invention;

FIG. 6 is a diagram illustrating an example of a recommended word index database storing a recommended word list sorted by a Korean-Japanese prefix index according to an embodiment of the present invention;

FIG. 7 is a diagram illustrating an example of a recommended word index database storing a recommended word list sorted by a Korean-Japanese suffix index according to an embodiment of the present invention;

FIG. 8 is a diagram illustrating an example of a recommended word index database storing a recommended word list sorted by an English-Japanese prefix index according to an embodiment of the present invention;

FIG. 9 is a diagram illustrating an example of a recommended word index database storing a recommended word list sorted by an English-Japanese suffix index according to an embodiment of the present invention;

FIG. 10 is a diagram illustrating an example of a setting mode according to an embodiment of the present invention;

FIG. 11 is a diagram illustrating a relation between a setting mode and an indexer module according to an embodiment of the present invention;

FIG. 19 is a diagram illustrating an example of an autocomplete recommended word list which is provided to a user, when a setting mode is mode 11, according to the example of the setting mode.

DETAILED DESCRIPTION OF EMBODIMENTS

Figure 1:
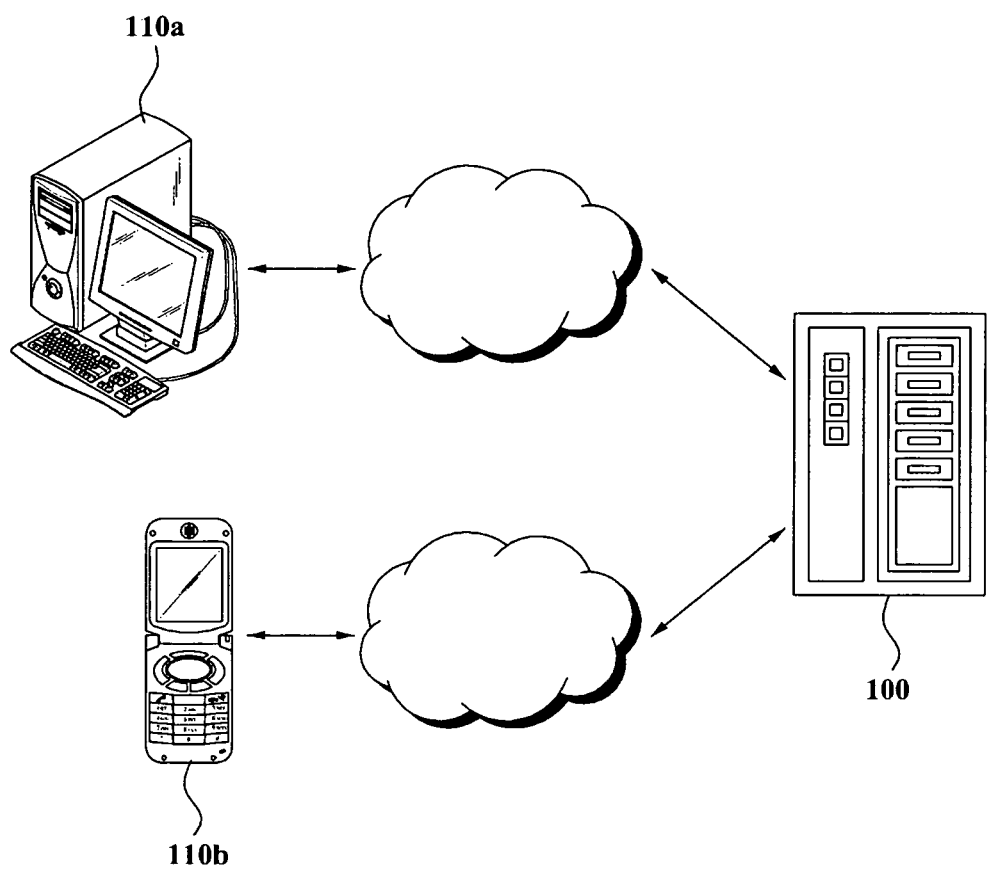
FIG. 1 is a diagram illustrating a network connection of a system for providing an autocomplete recommended word according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A recommended word according to the present invention includes various words such as a query log, a dictionary entry, a product entry, a book entry, a singer entry, a movie entry, and the like.

FIG. 1 is a diagram illustrating a network connection of a system for providing an autocomplete recommended word according to an embodiment of the present invention.

Referring to FIG. 1, a system for providing an autocomplete recommended word 100 stores and maintains a recommended word list in a predetermined recommended word index database. Also, the system for providing an autocomplete recommended word 100 classifies the recommended word list which is stored in the recommended word index database, according to a prefix of a consonant/vowel unit, a prefix of a syllable unit, or a suffix of a syllable unit, and divides the classified recommended word list for each of any one of prefix index of the consonant/vowel unit, the prefix index of the syllable unit, and the suffix index of the syllable unit. Also, the system for providing an autocomplete recommended word 100 stores the divided recommended word list in a predetermined recommended word index database. The recommended word list includes recommended word lists with respect to various foreign languages such as Korean, English, Japanese, Chinese, and the like.

A user accesses a web server of the system for providing an autocomplete recommended word 100 via wire/wireless network by using a user terminal 110a or 110b, and inputs a query. In this instance, the web server receives input information including a user input query and a setting mode from a user's web browser, and transfers the input information to a query autocompletion server of the system for providing an autocomplete recommended word 100. Also, the query autocompletion server receives the input information from the web server, and extracts at least one autocomplete recommended word which is associated with the input information from the recommended word index database, and transmits the at least one autocomplete recommended word to the web server. Accordingly, the web server receives the at least one autocomplete recommended word from the query autocompletion server, and transmits the at least one autocomplete recommended word to the web browser. Thus, the user may select a desired autocomplete recommended word when inputting the query, and easily complete the query.

Figure 2:
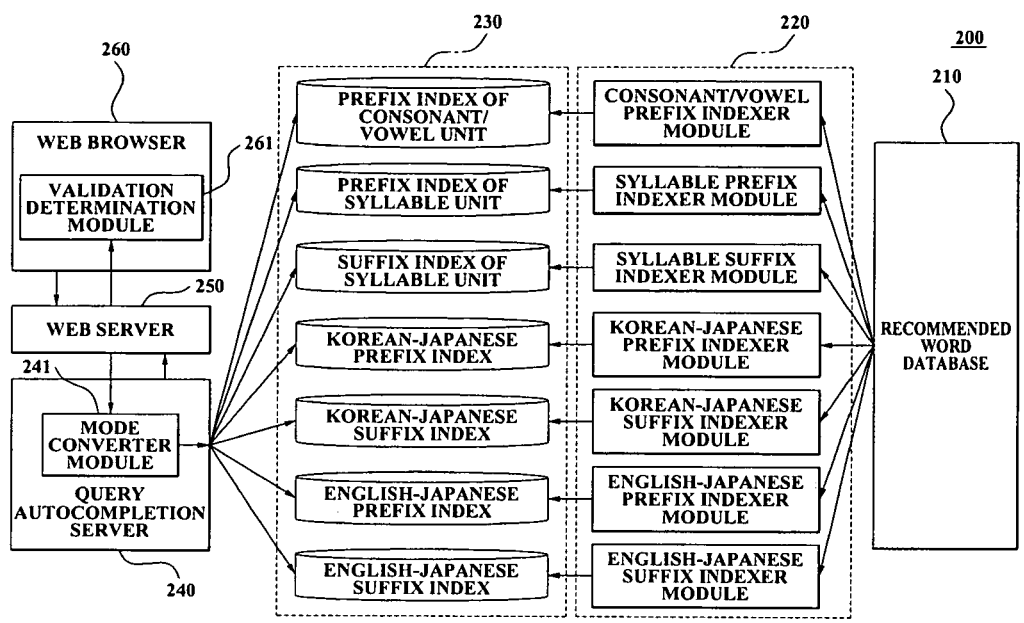
FIG. 2 is a block diagram illustrating a configuration of a system for providing an autocomplete recommended word according to an embodiment of the present invention.

FIG. 2 is a block diagram illustrating a configuration of a system for providing an autocomplete recommended word according to an embodiment of the present invention.

Referring to FIG. 2, the system for providing an autocomplete recommended word 200 according to an embodiment of the present invention includes a recommended word database 210, a recommended word indexer module 220, a recommended word index database 230, a query autocompletion server 240, and a web server 250.

The recommended word database 210 stores and maintains a recommended word list in various foreign languages. The recommended word list may include many languages such as Korean, English, and Japanese, for example, '소개, 동사무소, social, espresso, そうして, うそ'.

The recommended word indexer module 220 converts the recommended word list of a first language which is stored in the recommended word database 210 to a converted word for indexing of a second language which is associated with the first language. Also, the recommended word indexer module 220 indexes the converted word for indexing according to a syllable unit. In this instance, in the converted word for indexing, a pronunciation of the recommended word list of the first language may be provided in the second language, which will be described in detail below.

Also, according to another embodiment of the present invention, the recommended word indexer module 220 may index a recommended word list of the second language which is stored in the recommended word database 210 according to the prefix of a consonant/vowel unit, the prefix of the syllable unit, or the suffix of the syllable unit.

Also, according to still another embodiment of the present invention, when the recommended word indexer module 220 is a first language indexer module with respect to a second language input, the recommended word indexer module 220 may include a converter module and an indexer module. In this instance, the converter module converts the recommended word of the first language to the converted word for indexing of the second language which is associated with the first language. The indexer module indexes the converted word for indexing, based on the prefix of the consonant/vowel unit, the prefix of the syllable unit, or the suffix of the syllable unit.

Also, the recommended word indexer module 220 according to an embodiment of the present invention may include seven indexer modules as shown in FIG. 2. However, a number of the indexer modules included in the recommended word indexer module 220 may vary depending upon a desired number of languages to be applied and/or a type of an index.

The recommended word index database 230 divides and stores the converted word for indexing and the recommended word list of the first language corresponding to the converted word for indexing each of any one of a consonant/vowel unit index and a syllable unit index.

Also, according to another embodiment of the present invention, the recommended word index database 230 may divide and store the indexed recommended word list of the second language for each of any one of the prefix index of the consonant/vowel unit, the prefix of the syllable unit, and the suffix of the syllable unit.

According to still another embodiment of the present invention, the recommended word index database 230 may include a search frequency for each recommended word, arrange the recommended word list in an order of highest search frequency, and store the recommended word list.

The query autocompletion server 240 receives a query of the second language from the web server 250. Also, the query autocompletion server 240 extracts an autocomplete recommended word of the first language which is associated with the query of the second language from the recommended word index database 230, and transmits the autocomplete recommended word of the first language to the web server 250.

According to another embodiment of the present invention, the query autocompletion server 240 receives the query of the second language and a setting mode from the web server 250. Also, the query autocompletion server 240 extracts the autocomplete recommended word of the first language or an autocomplete recommended word of the second language from the recommended word index database 230. In this instance, the autocomplete recommended word of the first language or an autocomplete recommended word of the second language is associated with the query of the second language and the setting mode. Also, the query autocompletion server 240 transmits the autocomplete recommended word of the first language or the autocomplete recommended word of the second language to the web server 250. In this instance, the setting mode may include selection information about the prefix index of the consonant/vowel unit, the prefix of the syllable unit, or the suffix of the syllable unit.

According to still another embodiment of the present invention, the query autocompletion server 240 may extract a predetermined number of autocomplete recommended word lists, from the recommended word list which is associated with the query of the second language, in an order of highest search frequency.

According to yet another embodiment of the present invention, when the recommended word list is arranged in alphabetical order, the query autocompletion server 240 may extract the predetermined number of recommended word lists which are arranged in the alphabetical order.

According to a further embodiment of the present invention, the setting mode includes the selection information about at least any one of the prefix index of the consonant/vowel unit, the prefix of the syllable unit, and the suffix of the syllable unit. The query autocompletion server 240 may include a mode converter module 241 converting the setting mode according to the selection information. In this instance, the query autocompletion server 240 may extract at least one autocomplete recommended word from the recommended word list corresponding to the setting mode of the recommended word index database 230.

The web server 250 receives the query of the second language from a web browser 260, and transfers the query of the second language to the query autocompletion server 240. Also, the web server 250 receives the autocomplete recommended word of the first language which is associated with the query of the second language from the query autocompletion server 240, and transmits the autocomplete recommended word of the first language to the web browser 260.

According to another embodiment of the present invention, the web server 250 receives the query of the second language and the setting mode from the web browser 260, and transfers the query of the second language and the setting mode to the query autocompletion server 240. Also, the web server 250 receives the autocomplete recommended word of the first language according to the query of the second language and the setting mode from the query autocompletion server 240, and transmits the autocomplete recommended word of the first language to the web browser 260.

According to still another embodiment of the present invention, the web server 250 transmits the at least one autocomplete recommended word and the query of the second language to the web browser 260. In this instance, the web browser 260 may further include a validation determination module 261. The validation determination module 261 determines whether the query of the second language is identical to a query currently inputted, and outputs the at least one autocomplete recommended word when the query of the second language is identical to the query currently inputted. In this instance, the validation determination module 261 may be operated in the web browser 260, as a browser plug-in.

According to yet another embodiment of the present invention, the web server 250 provides the user with the autocomplete recommended word list substantially in real time, when the user inputs the query of the second language via the web browser 260.

According to a further embodiment of the present invention, the web server 250 may provide a different display of an autocomplete recommended word which satisfies a predetermined standard, from the autocomplete recommended word list, and provides the user with the autocomplete recommended word. In this instance, the predetermined standard may include any one of 1) when the autocomplete recommended word is identical to a user input query and 2) when a content retrieval or a shortcut which is associated with the autocomplete recommended word.

Figure 3:
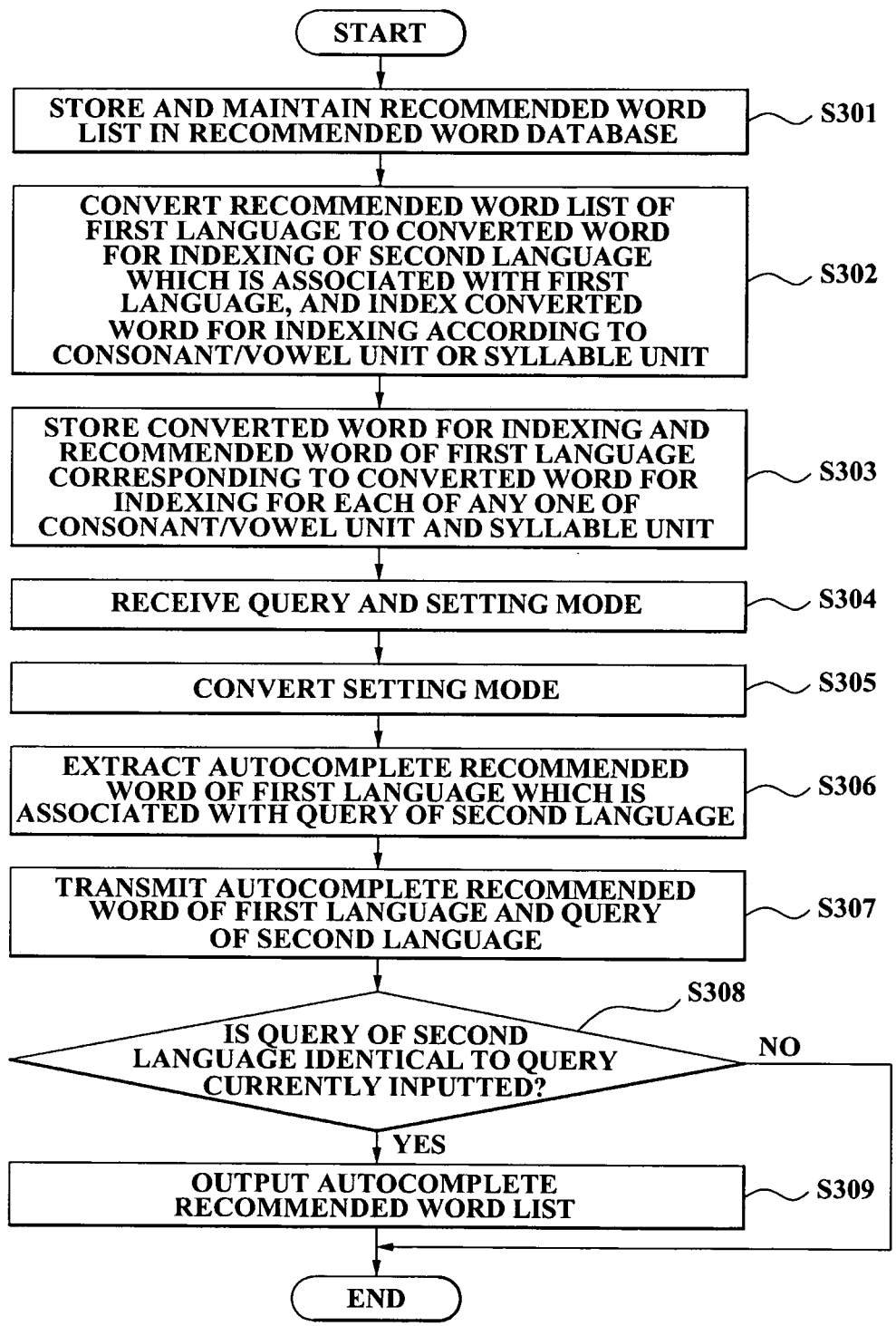
FIG. 3 is a flowchart illustrating a method of providing an autocomplete recommended word according to an embodiment of the present invention.

FIG. 3 is a flowchart illustrating a method of providing an autocomplete recommended word according to an embodiment of the present invention. The method of providing an autocomplete recommended word according to the embodiment of the present invention may be performed in the system of providing an autocomplete recommended word 200 as illustrated in FIG. 2.

Referring to FIGS. 2 and 3, in operation S301, the system of providing an autocomplete recommended word 200 stores and maintains a recommended word list in a recommended word database 210.

The recommended word list may be all query sets which are inputted by a user in a predetermined search web site, and include a search frequency for each query. In this instance, the search web site is maintained by a web server 250. The search frequency, for example, may be a type of statistical information which is generated by analyzing how many times a particular query has been inputted during a predetermined period. Also, the recommended word list may be inputted by the user in the search web site in Korean, English, Japanese, Chinese, and the like.

In operation S302, a recommended word indexer module 220 of the system of providing an autocomplete recommended word 200 converts a recommended word list of a first language which is stored in the recommended word database 210 to a converted word for indexing of a second language which is associated with the first language, and indexes the converted word for indexing according to any one of a consonant/vowel unit and a syllable unit. In this instance, in the converted word for indexing, a pronunciation of the recommended word list of the first language is provided in a second language. For this, as shown in FIG. 2, the recommended word indexer module 220 may include a Korean-Japanese prefix indexer module, a Korean-Japanese suffix indexer module, an English-Japanese prefix indexer module, or an English-Japanese suffix indexer module.

Also, according to another embodiment of the present invention, in operation S302, the recommended word indexer module 220 may index a recommended word list of the second language which is stored in a recommended word database 210 according to a prefix of a consonant/vowel unit, the prefix of a syllable unit, or a suffix of the syllable unit. For this, the recommended word indexer module 220 may include a consonant/vowel prefix indexer module, a syllable prefix indexer module, and a syllable suffix indexer module.

In the present invention, 'classifying the recommended word list' may include indexing the recommended word list according to at least one method using the prefix of the consonant/vowel unit, the prefix of the syllable unit, and the suffix of the syllable unit.

Accordingly, one recommended word may be indexed not by only one method, but by various methods described above. Also, the recommended word may be classified according to the prefix of the consonant/vowel unit, the prefix of the syllable unit, or the suffix of the syllable unit. For example, a recommended word, '당나귀' may be indexed into 'ㄷ', '다', '당', '당ㄴ', '당나', '당낙', '당나구', and '당나귀' according to the prefix of the consonant/vowel unit. Also, the recommended word, '당 나귀' may be indexed into '당', '당ㄴ', and '당나귀' according to the prefix of the syllable unit, or '귀', '나귀', and '당나귀' according to the suffix of the syllable unit.

The greatest distinguishing characteristic of Hangul, which is different from other foreign characters such as Chinese characters, is that Hangul consists of consonant units and vowel units. Specifically, Hangul includes basic consonants and vowels which include 19 initial sounds, 21 intermediate sounds, and 28 final sounds, and regularly combines the basic consonants and vowels to generate a word. Depending upon the characteristic of Hangul, the consonant/vowel prefix indexer module of the recommended word indexer module 220 classifies the recommended word list which is stored in the recommended word database 210 according to the consonant/vowel unit.

The term 'consonant/vowel unit' used throughout the present specification includes a general meaning of consonants and vowels, such as the initial sounds, the intermediate sounds, and the final sounds, and also includes all the characters and words which are generated by combining the initial sound and the final sound. As an example, '다' may be divided into two consonant/vowel units, such as 'ㄷ' and 'ㅏ'. Also, '다' itself may correspond to a single consonant/vowel unit.

Also, in the present invention, the term 'consonant/vowel unit' includes a concept of a 'minimal input unit of an input terminal'. As an example, 'ㅗ' and k' must be inputted to generate the single vowel 'ㅘ' in a Hangul dual mode keyboard. In the case of a simple consonant/vowel unit, a word '와우' may be indexed into 'ㅇ', '와', '와ㅇ', and '와우'. However, in the present invention, as described above, the 'consonant/vowel unit' includes the concept of the 'minimal input unit of the input terminal'. Accordingly, in the case of a Hangul dual mode keyboard, the word '와우' may be indexed into 'ㅇ', 'ㅇ', '와', '왕', and '와우'. Also, when the input terminal is changed into another terminal following a different input method, indexes of the minimal input unit may be changed.

Also, the syllable prefix indexer module of the recommended word indexer module 220 indexes the recommended word list which is stored in the recommended word database 210 according to the syllable unit.

The prefix is a kind of affix, and is added to the beginning of a word to add a meaning, and thereby generally generates another word. Also, the prefix may not be used alone, and is combined to the root of a word to add various meanings. As an example, prefixes, which are added to substantives, may include '올-' which designates something previous or elder, '짓-', which designates an excessive behavior, '불-' which designates something negative, and the like.

However, in the present invention, the term 'prefix' includes all the general meanings of prefixes, and also designates all the words and characters which can be added to the beginning of a word.

As described above, in the present invention, the term 'prefix' has a meaning or concept of 'indexing from the beginning of the word'. For example, although a word, '소' which designates a cow or a bull, is a complete noun itself, the word, '소' falls within a scope of the prefix in the present invention, since the word, '소' may function to complete the recommended word such as '소개' or '소녀'..

The syllable unit suffix indexer module of the recommended word indexer module 220 classifies the recommended word list which is stored in the recommended word database 210 according to the suffix.

The suffix is a kind of affix, and is added to the end of a word to add a meaning, and thereby generally generates another word. Also, the suffix may not be used alone, and is combined to the root of a word to add various meanings. As an example, suffixes, which are added to substantives, may include '-님' which designates an honorific title, '-수', '-자', etc. which designates an operating subject, '-들' which designates plural, and '-화', '-식', '-적', and the like. Also, suffixes added to conjugated words may include '이 히 리 기 우', and the like, which designate a causative and a passive.

However, in the present invention, the term 'suffix' includes all the general meanings of suffixes, and also designates all the words and characters which can be added to a tail of a word.

As an example, although the word, '소' is not generally included in the suffix, the word, '소' falls within the scope of the suffix in the present invention, since the word, '소' is located in the end of the word such as '동사무소' and '청소'. As described above, in the present invention, the term 'suffix' has a meaning or concept of 'indexing from the end of the word'. For example, although a word, '소' which designates the cow or the bull is the complete noun itself, the word, '소' falls within the scope of the suffix in the present invention, since the word, '소' may function to complete the recommended word such as '동사무소' or '청소'.

In operation S303, the system of providing an autocomplete recommended word 200 stores the converted word for indexing the recommended word of the first language corresponding to the converted word for indexing for each of any one of consonant/vowel unit index and syllable unit index in the recommended word index database 230. For example, as shown in FIG. 2, the recommended word index database 230 may divide and store a Korean-Japanese prefix index, a Korean-Japanese suffix index, an English-Japanese prefix index, or an English-Japanese suffix index.

For example, a Japanese recommended word, 'そうして' may be stored in a Korean-Japanese prefix indexer module with respect to '소', or in an English-Japanese prefix indexer module with respect to 'so'.

Also, for example, a Japanese recommended word, 'うそ' may be stored in a Korean-Japanese suffix indexer module with respect to '소', or in an English-Japanese suffix indexer module with respect to 'so'.

Also, according to another embodiment of the present invention, in operation S303, the system of providing an autocomplete recommended word 200 stores the indexed recommended word list of the second language for each of any one of the prefix index of the consonant/vowel unit, the prefix index of the syllable unit, or the suffix index of the syllable unit in the recommended word index database 230. For this, as shown in FIG. 2, the recommended word index database 230 may store the recommended word list for each of any one of the prefix index of the consonant/vowel unit, the prefix index of the syllable unit, or the suffix index of the syllable unit.

Accordingly, one recommended word may be divided into the prefix of the consonant/vowel unit, the prefix of the syllable unit, or the suffix of the syllable unit according to the three methods of indexing described above, and stored in the recommended word index database 230. For example, the recommended word, '당나귀' may be stored in the consonant/vowel prefix index, such as 'ㄷ', and stored in the syllable prefix index, such as '당'.. Also, the recommended word, '당나귀' may be stored in the syllable suffix index, such as '귀'.

The system of providing an autocomplete recommended word 200 may update the recommended word index database 230 by periodically repeating operations S302 and S303.

FIG. 4 is a diagram illustrating an example of a search string and a recommended word list sorted by a prefix index of a syllable unit according to an embodiment of the present invention.

As shown in FIG. 4, a recommended word index database 230 may include the search string and the recommended word list. In this instance, the search string is a standard of the prefix index of the syllable unit, and the recommended word list is based on the prefix index of the syllable unit. As an example, when a Korean word, '소' is the search string, '소개', '소녀', and the like may be stored as a recommended word of the recommended word list. Also, when an English word, 'so' is the search string, 'social', 'society', and the like may be stored as the recommended word of the recommended word list. When a Japanese word, 'そ' is the search string, 'そう', 'そう して', and the like may be stored as the recommended word of the recommended word list.

As shown in FIG. 4, each of the recommended words may be arranged in an order of highest search frequency and stored in the recommended word index database 230. Also, each of the recommended words may be arranged in alphabetical order, and stored in the recommended word index database 230. In this case, a web server 250 may provide an extracted autocomplete recommended word without performing an arranging process with respect thereto. Accordingly, a recommended word autocompletion may be effectively performed in real time.

FIG. 5 is a diagram illustrating an example of a search string and a recommended word list sorted by a suffix index of a syllable unit according to an embodiment of the present invention.

As shown in FIG. 5, a recommended word index database 230 may include the search string and the recommended word list. In this instance, the search string is a standard of the suffix index of the syllable unit, and the recommended word list is based on the suffix index of the syllable unit. As an example, when a Korean word, '소' is the search string, '동사무소', '청소', and the like may be stored as a recommended word of the recommended word list. Also, when an English word, 'so' is the search string, 'also', 'espresso', and the like may be stored as the recommended word of the recommended word list. When a Japanese word, 'そ' is the search string, 'うそ', 'ようこそ', and the like may be stored as the recommended word of the recommended word list.

FIG. 6 is a diagram illustrating an example of a recommended word index database storing a recommended word list sorted by a Korean-Japanese prefix index according to an embodiment of the present invention.

As shown in FIG. 6, a recommended word index database 230 may include a Korean search string, a Japanese recommended word list, and a Korean converted word for indexing. As an example, when a word, '소' is the Korean search string, 'そう', 'そうして', and the like may be stored as a recommended word of the Japanese recommended word list, and '소우', '소우시테' and the like may be stored as the Korean converted word for indexing. In this instance, in the Korean converted word for indexing, a pronunciation of the Japanese word from the Japanese recommended word list is converted to and spelled with Korean. Also, each recommended word is arranged in an order of highest search frequency, and stored in the recommended word index database 230.

FIG. 7 is a diagram illustrating an example of a recommended word index database storing a recommended word list sorted by a Korean-Japanese suffix index according to an embodiment of the present invention.

As shown in FIG. 7, the recommended word index database 230 may include a Korean search string, a Japanese recommended word list, and a Korean converted word for indexing. As an example, when a word, '소' is the Korean search string, 'うそ', 'ようこそ', and the like may be stored as a recommended word of the Japanese recommended word list, and '우소', '요우코소', and the like may be stored as the Korean converted word for indexing. In this instance, in the Korean converted word for indexing, a pronunciation of the Japanese word from the Japanese recommended word list is converted to and spelled with Korean. Also, each recommended word is arranged in the order of highest search frequency, and stored in the recommended word index database 230.

FIG. 8 is a diagram illustrating an example of a recommended word index database storing a recommended word list sorted by an English-Japanese prefix index according to an embodiment of the present invention.

As shown in FIG. 8, the recommended word index database 230 may include an English search string, a Japanese recommended word list, and an English converted word for indexing. As an example, when an word, 'so' is the English search string, 'そう', 'そうして', and the like may be stored as a recommended word of the Japanese recommended word list, and 'so', 'soushite', and the like may be stored as the English converted word for indexing. In this instance, in the English converted word for indexing, a pronunciation of the Japanese word from the Japanese recommended word list is converted to and spelled with English. Also, each recommended word is arranged in the order of highest search frequency, and stored in the recommended word index database 230.

FIG. 9 is a diagram illustrating an example of a recommended word index database storing a recommended word list sorted by an English-Japanese suffix index according to an embodiment of the present invention.

As shown in FIG. 9, the recommended word index database 230 may include an English search string, a Japanese recommended word list, and an English converted word for indexing. As an example, when a word, 'so' is the English search string, 'うそ', 'ようこそ', and the like may be stored as a recommended word of the Japanese recommended word list, and 'uso', 'youkoso', and the like may be stored as the English converted word for indexing. In this instance, in the English converted word for indexing, a pronunciation of the Japanese word from the Japanese recommended word list is converted to and spelled with English. Also, each recommended word is arranged in the order of highest search frequency, and stored in the recommended word index database 230.

In operation S304, the web server 250 of the system of providing an autocomplete recommended word 200 receives a query and a setting mode from the user's web browser 260, and transfers the received query and the setting mode to the query autocompletion server 240. In this instance, the setting mode includes selection information about at least one of a prefix index of a consonant/vowel unit, the prefix index of a syllable unit, or a suffix index of the syllable unit.

In operation S305, the mode converter module 241 of the system of providing an autocomplete recommended word 200 converts the setting mode according to the selection information.

As an example, when the selection information is the prefix index of the consonant/vowel unit, the mode converter module 241 converts the setting mode to a mode of the prefix index of the consonant/vowel unit. In this instance, the mode of the prefix index of the consonant/vowel unit indexes an inputted Korean according to the prefix index of the consonant/vowel unit.

Also, when the selection information is the prefix index of the syllable unit, the mode converter module 241 converts the setting mode to a mode of the prefix index of the syllable unit. In this instance, the mode of the prefix index of the syllable unit indexes the inputted Korean according to the prefix index of the syllable unit.

Also, when the selection information is the suffix index of the syllable unit, the mode converter module 241 converts the setting mode to a mode of the suffix index of the syllable unit. In this instance, the mode of the suffix index of the syllable unit indexes the inputted Korean according to the suffix index of the syllable unit.

FIG. 10 is a diagram illustrating an example of a setting mode according to an embodiment of the present invention.

Referring to FIG. 10, an input language is identical to an autocomplete recommended word in a first recommended mode. The input language is different from the autocomplete recommended word in a second recommended mode. The autocomplete recommended word is composed of the first language and the second language in a third recommended mode.

In the first recommended mode, when the input language is the second language, the autocomplete recommended word according to the input language is the second language. For example, when the input language is Korean, the autocomplete recommended word according to the input language may be the Korean. Also, when the input language is English, the autocomplete recommended word according to the input language may be the English, and when the input language is Japanese, the autocomplete recommended word according to the input language may be the Japanese. Also, the first recommended mode may include a prefix index of a consonant/vowel unit, the prefix index of a syllable unit, and a suffix index of the syllable unit, with respect to the second language.

In the second recommended mode, when the input language is the second language, the autocomplete recommended word according to the input language is the first language. For example, when the second language is Korean, the first language is Japanese, and the setting mode is a Korean-Japanese prefix index, the autocomplete recommended word according to the input language may be a Japanese recommended word. In this instance, the Japanese recommended word corresponds to a converted word for indexing according to the prefix index.

In the third recommended mode, when the input language is the second language, the autocomplete recommended word according to the input language is the first language and the second language. For example, when the second language is Korean, the first language is Japanese, and the setting mode is a combination of the first language and the second language, the autocomplete recommended word according to the input language may include a Korean recommended word and a Japanese recommended word. In this instance, the Japanese recommended word corresponds to a converted word for indexing according to the mixed prefix index. An intention of a user's input is not certain in the third recommended mode. Accordingly, the user may select the recommended word of a desired language by providing the Korean recommended word as well as the Japanese recommended word, in the third recommended mode.

FIG. 1 is a diagram illustrating a relation between a setting mode and an indexer module according to an embodiment of the present invention.

Referring to FIG. 1, a first recommended mode is divided into mode 1, mode 2, and mode 3, depending upon an input language and an index. In this instance, an autocomplete recommended word is identical to the input language, and an indexer module below is used, respectively.

When the input language is Korean in mode 1, a consonant/vowel prefix indexer module is used. In this instance, the consonant/vowel prefix indexer module indexes a Korean recommended word list according to a consonant/vowel unit.

In mode 2, a syllable unit prefix indexer module indexing a recommended word list of the input language according to a prefix of a syllable unit is used. According to an embodiment of the present invention, when the input language is Korean in mode 2, the syllable unit prefix indexer module is a Korean syllable prefix indexer module indexing the Korean recommended word list according to the prefix of the syllable unit. Also, according to another embodiment of the present invention, when the input language is English in mode 2, the syllable prefix indexer module is an English syllable prefix indexer module indexing an English recommended word list according to the prefix of the syllable unit. According to still another embodiment of the present invention, when the input language is Japanese in mode 2, the syllable prefix indexer module is a Japanese syllable prefix indexer module indexing a Japanese recommended word list according to the prefix of the syllable unit.

In mode 3, a syllable suffix indexer module indexing the recommended word list of the input language according to a suffix of the syllable unit is used. According to an embodiment of the present invention, when the input language is Korean in mode 3, the syllable suffix indexer module is a Korean syllable suffix indexer module indexing the Korean recommended word list according to the suffix of the syllable unit. Also, according to another embodiment of the present invention, when the input language is English in mode 3, the syllable suffix indexer module is an English syllable suffix indexer module indexing an English recommended word list according to the suffix of the syllable unit. According to still another embodiment of the present invention, when the input language is Japanese in mode 3, the syllable suffix indexer module is a Japanese syllable suffix indexer module indexing the Japanese recommended word list according to the suffix of the syllable unit.

The second recommended mode is divided into mode 4 through mode 7, depending upon the input language and the index. In this instance, the autocomplete recommended word is different from the input language, and an indexer module below is used, respectively.

In mode 4, the input language is Korean, the autocomplete recommended word is Japanese, and a Korean-Japanese prefix indexer module is used. The Korean-Japanese prefix indexer module converts a Japanese recommended word list to a Korean converted word for indexing, and indexes the Korean converted word for indexing according to the prefix of the consonant/vowel unit or the prefix of the syllable unit.

In mode 5, the input language is Korean, the autocomplete recommended word is Japanese, and a Korean-Japanese suffix indexer module is used. The Korean-Japanese suffix indexer module converts the Japanese recommended word list to the Korean converted word for indexing, and indexes the Korean converted word for indexing according to the suffix of the syllable unit.

In mode 6, the input language is English, the autocomplete recommended word is Japanese, and an English-Japanese prefix indexer module is used. The English-Japanese prefix indexer module converts the Japanese recommended word list to an English converted word for indexing, and indexes the English converted word for indexing according to the prefix of the syllable unit.

In mode 7, the input language is English, the autocomplete recommended word is Japanese, and an English-Japanese suffix indexer module is used. The English-Japanese suffix indexer module converts the Japanese recommended word list to the English converted word for indexing, and indexes the English converted word for indexing according to the suffix of the syllable unit.

The third recommended mode is divided into mode 8 through mode 11, depending upon the input language and the index. In this instance, when the autocomplete recommended word provides a recommended word in the input language and Japanese, and two indexer modules below are used, respectively.

In mode 8, the input language is Korean, and the Korean-Japanese prefix indexer module and a Korean consonant/vowel or syllable prefix indexer module may be used.

In mode 9, the input language is Korean, and the Korean-Japanese suffix indexer module and the Korean syllable suffix indexer module may be used.

In mode 10, the input language is English, and the English-Japanese prefix indexer module and an English syllable prefix indexer module may be used.

In mode 11, the input language is English, and the English-Japanese suffix indexer module and the English syllable suffix indexer module may be used.

In operation S306, a query autocompletion server 240 of the system of providing an autocomplete recommended word 200 receives input information including a query of a second language and a setting mode from a web server 250, extracts an autocomplete recommended word of a first language which is associated with the query of the second language from a recommended word index database 230, and transmits the autocomplete recommended word of the first language to the web server 250. The setting mode may include selection information about a prefix index of a consonant/vowel unit, the prefix of a syllable unit, or a suffix of the syllable unit.

According to another embodiment of the present invention, in operation S306, the query autocompletion server 240 may extract at least one autocomplete recommended word from a recommended word list corresponding to the selected index from the recommended word index database 230.

According to still another embodiment of the present invention, in operation S306, the query autocompletion server 240 receives input information including the query of the second language and the setting mode from the web server 250, extracts an autocomplete recommended word of the second language from the recommended word index database 230, and transmits the autocomplete recommended word of the second language to the web server 250.

In operation S306, when extracting the at least one autocomplete recommended word, the query autocompletion server 240 extracts the at least one autocomplete recommended word corresponding to a user input query from the recommended word index database 230. In this instance, the user input query is included in the input information, from the recommended word list corresponding to the selected index according to the setting mode.

According to an embodiment of the present invention, in operation S306, when extracting the at least one autocomplete recommended word, the query autocompletion server 240 may extract a predetermined number of autocomplete recommended words from the recommended word list which is associated with the input information in an order of highest search frequency.

As an example, when a user inputs '소' into a search window, the query autocompletion server 240 may not extract all recommended word lists starting with '소', but extract 10 recommended word lists when the predetermined number of extracted autocomplete recommended words is 10. Also, in this case, since the query autocompletion server 240 determines the 10 recommended word lists according to the search frequency, only recommended words with a high possibility of being inputted by the user may be provided to the user.

In operation S305, when the mode converter 241 converts the setting mode, which is received in operation S304, the query autocompletion server 240 may extract the at least one autocomplete recommended word of the recommended word list corresponding to the converted setting mode, in operation S306.

In operation S307, the web server 250 receives the at least one autocomplete recommended word from the query autocompletion server 240, and transmits the at least one autocomplete recommended word to the web browser 260. In this instance, the web server 250 may transmit the at least one autocomplete recommended word and the user input query to the web browser 260.

In operation S308, a validation determination module 261 determines whether the user input query is identical to a query currently inputted on the search window in the web browser 260. In this instance, the user input query is received from the web server 250. The validation determination module 261 may be operated in the web browser 260, as a browser plug-in.

When the user input query is identical to the query currently inputted in the web browser 260 in operation S308, the validation determination module 261 outputs the autocomplete recommended word list including the at least one autocomplete recommended word received from the web server 250 in operation S309.

As described above, the web server 250 transmits the autocomplete recommended word list and the user input query, which are received in operation S307, to the web browser 260. The validation determination module 261 operated in the web browser 260 determines whether the converted user input query is identical to the query currently inputted in the web browser 260, and outputs the autocomplete recommended word list.

Accordingly, through operation S308 and operation S309, the validation determination module 261 may prevent an autocomplete recommended word list which is irrelevant to the user input query that may occur due to a network delay.

Figure 12:
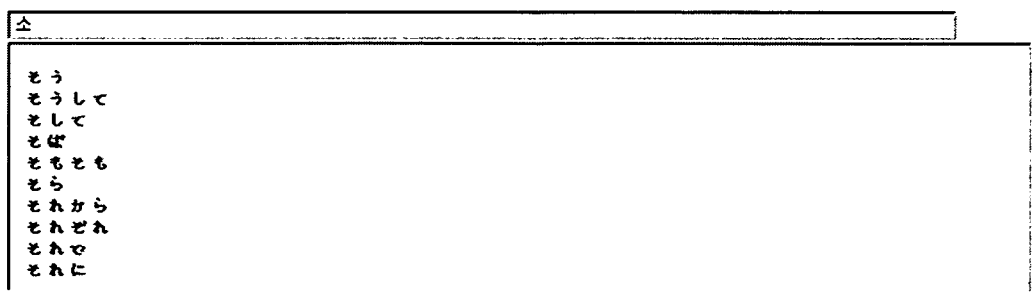
FIG. 12 is a diagram illustrating an example of an autocomplete recommended word list which is provided to a user, when a setting mode is mode 4, according to the example of the setting mode.

FIG. 12 is a diagram illustrating an example of an autocomplete recommended word list which is provided to a user, when a setting mode is mode 4.

As shown in FIG. 12, when the user inputs '소' into a search window, a system for providing an autocomplete recommended word 200 performs operation S304 through operation S309 according to mode 4. Therefore, the system for providing an autocomplete recommended word 200 may output the autocomplete recommended word list at the bottom of the search window. In this instance, the autocomplete recommended word list includes a recommended word which is indexed according to a Japanese prefix corresponding to a pronunciation of the Korean, '소', such as 'そうして', 'そう', 'そして', and the like.

For this, a query autocompletion server 240 may extract a predetermined number of recommended words, for the autocomplete recommended word list, and may arrange the recommended words in an order of highest search frequency. Also, the query autocompletion server 240 may transmit the autocomplete recommended word list via a web server 250 to a web browser 260.

Also, the query autocompletion server 240 may extract a predetermined number of autocomplete recommended word lists which are arranged in alphabetical order. Also, the query autocompletion server 240 may transmit the autocomplete recommended word list via the web server 250 to the web browser 260.

Figure 13:
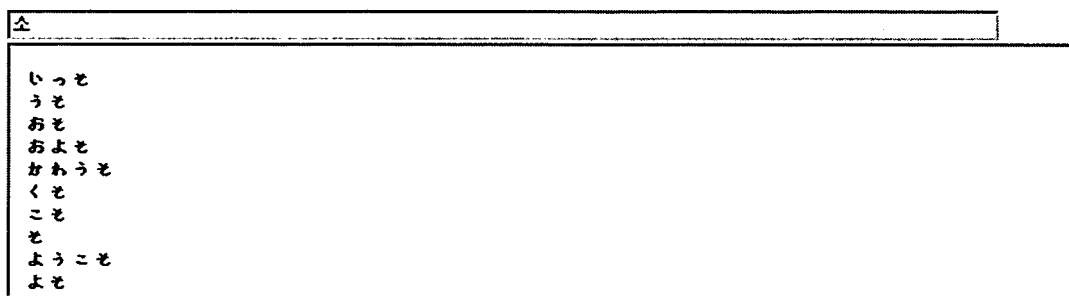
FIG. 13 is a diagram illustrating an example of an autocomplete recommended word list which is provided to a user, when a setting mode is mode 5, according to the example of the setting mode.

FIG. 13 is a diagram illustrating an example of an autocomplete recommended word list which is provided to a user, when a setting mode is mode 5.

As shown in FIG. 13, the example of the autocomplete recommended word list is illustrated. In this instance, the user inputs '소' into a search window, and a Korean-Japanese suffix index which is mode 5 is selected as the setting mode, unlike FIG. 12. The setting mode may be selected by the user or randomly selected by a system for providing an autocomplete recommended word 200.

Also, when the user inputs '소' into the search window, the system for providing an autocomplete recommended word 200 performs operation S304 through operation S309. Therefore, the system for providing an autocomplete recommended word 200 may output the autocomplete recommended word list at the bottom of the search window. In this instance, the autocomplete recommended word list includes a recommended word which is indexed according to a Japanese suffix corresponding to the pronunciation of the Korean, '소', such as 'いつぞ', 'うぞ', 'おぞ', and the like.

For this, a query autocompletion server 240 may extract a predetermined number of autocomplete recommended word lists which are arranged in the order of highest search frequency or alphabetical order, for each recommended word. Also, the query autocompletion server 240 may transmit the autocomplete recommended word list via a web server 250 to a web browser 260.

Figure 14:
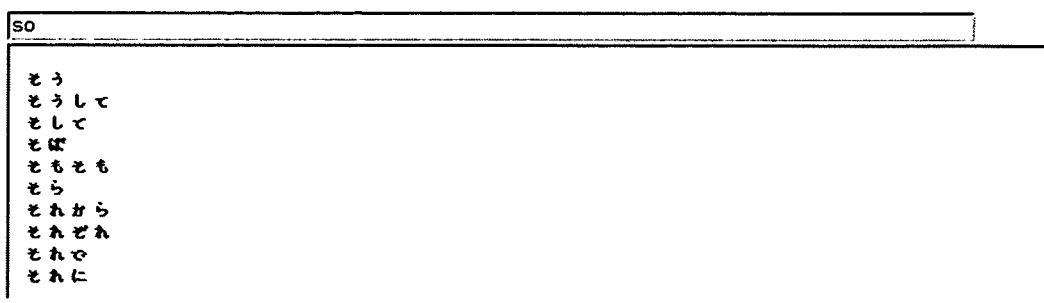
FIG. 14 is a diagram illustrating an example of an autocomplete recommended word list which is provided to a user, when a setting mode is mode 6, according to the example of the setting mode.

FIG. 14 is a diagram illustrating an example of an autocomplete recommended word list which is provided to a user, when a setting mode is mode 6.

As shown in FIG. 14, an example of the autocomplete recommended word list is illustrated. In this instance, the user inputs 'so' into the search window, and an English-Japanese prefix index which is mode 6 is selected as the setting mode, unlike FIG. 12. The setting mode may be selected by the user or randomly selected by the system for providing an autocomplete recommended word 200.

Also, when the user inputs 'so' into the search window, the system for providing an autocomplete recommended word 200 performs operation S304 through operation S309. Therefore, the system for providing an autocomplete recommended word 200 may output the autocomplete recommended word list at the bottom of the search window. In this instance, the autocomplete recommended word list includes a recommended word which is indexed according to a Japanese prefix corresponding to the pronunciation of the English, 'so', such as 'そうして', 'そう', 'そして', and the like.

For this, the query autocompletion server 240 may extract a predetermined number of autocomplete recommended word list which is arranged in the order of highest search frequency or the alphabetical order, for each recommended word. Also, the query autocompletion server 240 may transmit the autocomplete recommended word list via the web server 250 to the web browser 260.

Figure 15:
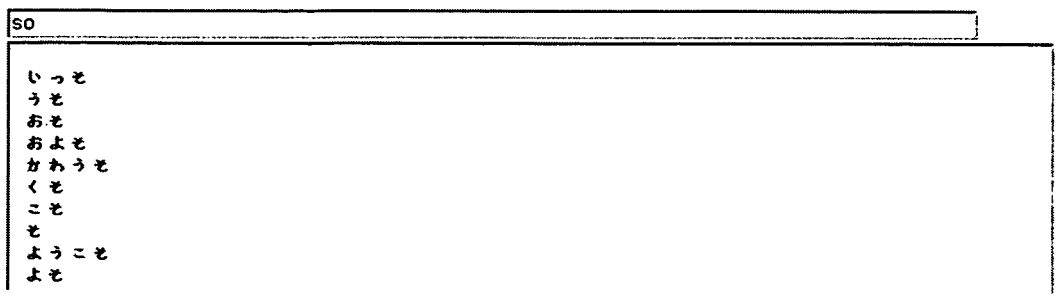
FIG. 15 is a diagram illustrating an example of an autocomplete recommended word list which is provided to a user, when a setting mode is mode 7, according to the example of the setting mode.

FIG. 15 is a diagram illustrating an example of an autocomplete recommended word list which is provided to a user, when a setting mode is mode 7.

As shown in FIG. 15, the example of the autocomplete recommended word list is illustrated. In this instance, the user inputs 'so' into the search window, and an English-Japanese suffix index which is mode 7 is selected as the setting mode, unlike FIG. 14. The setting mode may be selected by the user or randomly selected by the system for providing an autocomplete recommended word 200.

Also, when the user inputs 'so' into the search window, the system for providing an autocomplete recommended word 200 performs operation S304 through operation S309. Therefore, the system for providing an autocomplete recommended word 200 may output the autocomplete recommended word list at the bottom of the search window. In this instance, the autocomplete recommended word list includes a recommended word which is indexed according to a Japanese suffix corresponding to the pronunciation of the English, 'so', such as 'いつぞ', 'うぞ', 'おぞ', and the like.

For this, the query autocompletion server 240 may extract a predetermined number of autocomplete recommended word list which is arranged in the order of highest search frequency or in alphabetical order, for each recommended word. Also, the query autocompletion server 240 may transmit the autocomplete recommended word list via the web server 250 to the web browser 260.

Figure 16:
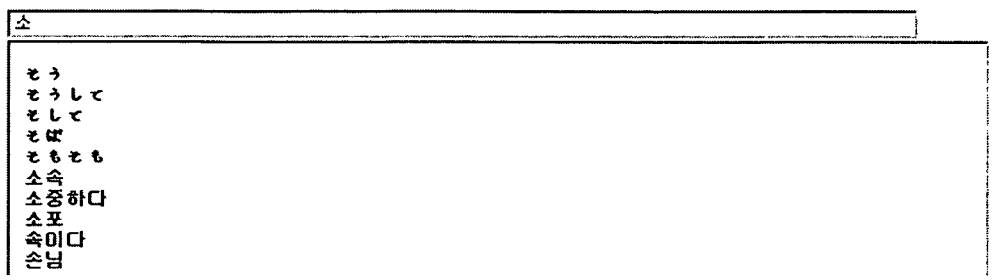
FIG. 16 is a diagram illustrating an example of an autocomplete recommended word list which is provided to a user, when a setting mode is mode 8, according to the example of the setting mode.

FIG. 16 is a diagram illustrating an example of an autocomplete recommended word list which is provided to a user, when a setting mode is mode 8.

As shown in FIG. 16, the example of the autocomplete recommended word list is illustrated. In this instance, the user inputs '소' into the search window, and a Korean-Japanese prefix index and a Korean prefix index which is mode 8 is selected as the setting mode. The setting mode may be selected by the user or randomly selected by the system for providing an autocomplete recommended word 200.

Also, when the user inputs '소' into the search window, the system for providing an autocomplete recommended word 200 performs operation S304 through operation S309. Therefore, the system for providing an autocomplete recommended word 200 may output the autocomplete recommended word list at the bottom of the search window. In this instance, the autocomplete recommended word list includes a recommended word which is indexed according to a Japanese prefix corresponding to the pronunciation of the Korean, '소', such as 'そうして', 'そう', 'そして', and the like. Also, the autocomplete recommended word list includes a Korean recommended word which is indexed according to the Korean prefix index corresponding to the pronunciation of the Korean, '소', such as '소속', '소중하다', '소포', and the like.

For this, the query autocompletion server 240 may extract a predetermined number of autocomplete recommended word list which is arranged in the order of highest search frequency or the alphabetical order, for each recommended word. Also, the query autocompletion server 240 may transmit the autocomplete recommended word list via the web server 250 to the web browser 260.

Figure 17:
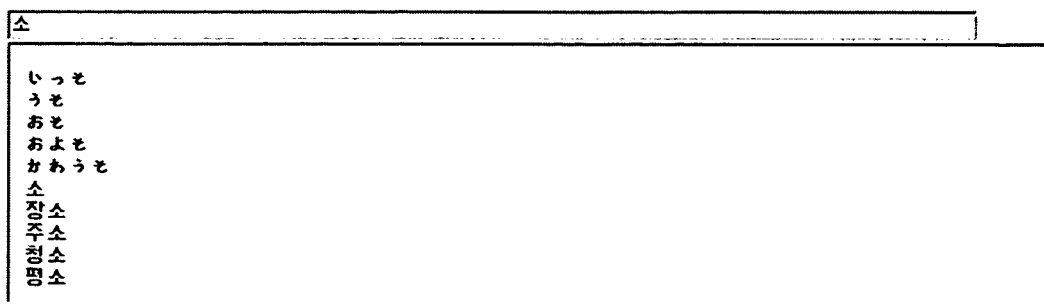
FIG. 17 is a diagram illustrating an example of an autocomplete recommended word list which is provided to a user, when a setting mode is mode 9, according to the example of the setting mode.

FIG. 17, is a diagram illustrating an example of an autocomplete recommended word list which is provided to a user, when a setting mode is mode 9.

As shown in FIG. 17, the example of the autocomplete recommended word list is illustrated. In this instance, the user inputs '소' into the search window, and a Korean-Japanese suffix index and a Korean syllable suffix index which is mode 9 is selected as the setting mode. The setting mode may be selected by the user or randomly selected by the system for providing an autocomplete recommended word 200.

Also, when the user inputs '소' into the search window, the system for providing an autocomplete recommended word 200 performs operation S304 through operation S309. Therefore, the system for providing an autocomplete recommended word 200 may output the autocomplete recommended word list at the bottom of the search window. In this instance, the autocomplete recommended word list includes a recommended word which is indexed according to a Japanese suffix corresponding to the pronunciation of the Korean, '소', such as 'いつぞ', 'うぞ', 'おぞ', and the like. Also, the autocomplete recommended word list includes a Korean recommended word which is indexed according to the Korean syllable suffix index corresponding to the pronunciation of the Korean, '소', such as '소', '장소', '주소', and the like.

For this, the query autocompletion server 240 may extract a predetermined number of autocomplete recommended word list which is arranged in the order of highest search frequency or the alphabetical order, for each recommended word. Also, the query autocompletion server 240 may transmit the autocomplete recommended word list via the web server 250 to the web browser 260.

Figure 18:
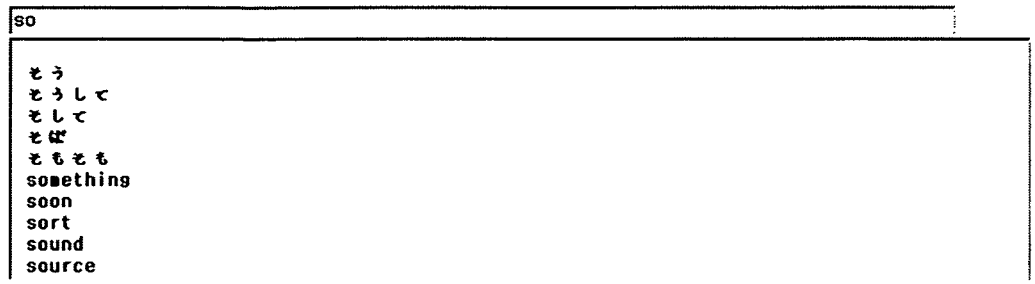
FIG. 18 is a diagram illustrating an example of an autocomplete recommended word list which is provided to a user, when a setting mode is mode 10, according to the example of the setting mode.

FIG. 18 is a diagram illustrating an example of an autocomplete recommended word list which is provided to a user, when a setting mode is mode 10.

As shown in FIG. 18, the example of the autocomplete recommended word list is illustrated. In this instance, the user inputs 'so' into the search window, and an English-Japanese prefix index and an English syllable prefix index which is mode 10 is selected as the setting mode. The setting mode may be selected by the user or randomly selected by the system for providing an autocomplete recommended word 200.

Also, when the user inputs 'so' into the search window, the system for providing an autocomplete recommended word 200 performs operation S304 through operation S309. Therefore, the system for providing an autocomplete recommended word 200 may output the autocomplete recommended word list at the bottom of the search window. In this instance, the autocomplete recommended word list includes the recommended word which is indexed according to a Japanese prefix corresponding to the pronunciation of the English, 'so', such as 'そうして', 'そう', 'そして', and the like. Also, the autocomplete recommended word list includes an English recommended word which is indexed according to the English syllable prefix index corresponding to the pronunciation of the English, 'so', such as 'something', 'soon', 'sort', and the like.

For this, the query autocompletion server 240 may extract a predetermined number of autocomplete recommended word list which is arranged in the order of highest search frequency or the alphabetical order, for each recommended word. Also, the query autocompletion server 240 may transmit the autocomplete recommended word list via the web server 250 to the web browser 260.

FIG. 19 is a diagram illustrating an example of an autocomplete recommended word list which is provided to a user, when a setting mode is mode 1.

As shown in FIG. 19, the example of the autocomplete recommended word list is illustrated. In this instance, the user inputs 'so' into the search window, and the English-Japanese suffix index and an English syllable suffix index which is mode 10 is selected as the setting mode. The setting mode may be selected by the user or randomly selected by the system for providing an autocomplete recommended word 200.

Also, when the user inputs 'so' into the search window, the system for providing an autocomplete recommended word 200 performs operation S304 through operation S309. Therefore, the system for providing an autocomplete recommended word 200 may output the autocomplete recommended word list at the bottom of the search window. In this instance, the autocomplete recommended word list includes a recommended word which is indexed according to a Japanese suffix corresponding to the pronunciation of the English, 'so', such as 'いつそ', 'うそ', 'おそ', and the like. Also, the autocomplete recommended word list includes an English recommended word which is indexed according to the English syllable suffix index corresponding to the pronunciation of the English, 'so', such as 'so', 'soso', 'toroso', and the like.

For this, the query autocompletion server 240 may extract a predetermined number of autocomplete recommended word list which is arranged in the order of highest search frequency or the alphabetical order, for each recommended word. Also, the query autocompletion server 240 may transmit the autocomplete recommended word list via the web server 250 to the web browser 260.

The method of providing an autocomplete recommended word according to the above-described embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, a system and method of providing an autocomplete recommended word may immediately propose a suitable recommended word corresponding to a pronunciation of a foreign word, when a user desires to input a foreign word, even when the user inputs only a portion of the pronunciation of the foreign word in another language.

According to the present invention, a system and method of providing an autocomplete recommended word may prevent a typographical error in a foreign language when searching, and propose a new search service providing a user an accurate query.

According to the present invention, a system and method of providing an autocomplete recommended word may select a desired recommended word of a first language, while inputting a query of a second language, and easily complete the query, by providing an autocomplete recommended word list which may classify a foreign recommended word list for each index based on a variety of standards, and automatically complete the recommended word which is desired to be inputted by a user according to a user input query and a setting mode which is received from a user's web browser.

According to the present invention, a system and method of providing an autocomplete recommended word may classify a recommended word list according to a consonant/vowel unit, to be suitable for a language which is classified based on the consonant/vowel unit, such as Korean, and extract an autocomplete recommended word corresponding to a user input query from the classified autocomplete recommended word list, when the user inputs a query corresponding to the consonant/vowel unit.

According to the present invention, a system and method of providing an autocomplete recommended word may provide an autocomplete recommended word by using a prefix as well as a suffix.

According to the present invention, a system and method of providing an autocomplete recommended word may effectively classify a recommended word list for each index based on a variety of standards, extract the autocomplete recommended word with respect to a query which is being inputted by a user in real time, and thereby may notably reduce a loss of time and a financial loss which are caused by separately inputting a conversion list or the recommended word list.

According to the present invention, a system and method of providing an autocomplete recommended word may automatically complete a recommended word with respect to a foreign language, reduce an amount of time for inputting a query, and thereby may provide a convenience to both a user and a user who is unfamiliar with a foreign language keyboard or a mouse.

According to the present invention, a system and method of providing an autocomplete recommended word may help a user who remembers only a portion of a pronunciation of a query in foreign language.

According to the present invention, a system and method of providing an autocomplete recommended word may ascertain another user's intention with respect to a query in various languages.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A system to provide an autocomplete recommended word, the system comprising:
   a recommended word database configured to store at least one first recommended word list, the at least one first recommended word list comprising at least one word in a first language;
   a recommended word indexer module configured to convert at least one first word in the at least one first recommended word list to at least one converted word, and to index the converted word according to at least one index unit, the at least one index unit comprising at least one of a consonant/vowel unit and a syllable unit, wherein the at least one converted word comprises a pronunciation in the first language of the at least one first word spelled using a second language different from the first language and the at least one index unit comprises a pronunciation of the at least one consonant/vowel unit and syllable unit spelled using the second language;
   a recommended word index database configured to store the at least one converted word in association with the at least one index unit; and
   a query autocompletion server configured to receive a query comprising a subject index unit comprising one of the at least one index unit, to determine at least one autocomplete recommended word, and to transmit the at least one autocomplete recommended word to a web server, wherein the at least one autocomplete recommended word comprises at least one first word that corresponds to at least one converted word that is indexed according to the subject index unit;
   wherein the at least one converted word has a different meaning in the second language than the at least one word in the first language.

2. The system of claim 1, wherein the web server is configured to receive the query from a web browser, to transfer the query to the query autocompletion server, to receive the at least one autocomplete recommended word from the query autocompletion server, and to transmit the at least one autocomplete recommended word to the web browser.

3. The system of claim 2, wherein the web server is configured to receive the query and a setting mode from the web browser, to transfer the query and the setting mode to the query autocompletion server, to receive the at least one autocomplete recommended word according to the query and the setting mode from the query autocompletion server, and to transmit the at least one autocomplete recommended word to the web browser.

4. The system of claim 3, wherein the setting mode comprises selection information about at least one of a prefix index of the consonant/vowel unit, a prefix index of the syllable unit, and a suffix index of the syllable unit, and
   wherein the query autocompletion server is configured to determine the at least one autocomplete recommended word from the recommended word index database using the selected index.

5. The system of claim 4, wherein, in response to a determination that the setting mode is the prefix index of the consonant/vowel unit, the recommended word indexer module is configured to index the at least one converted word according to the prefix index of the consonant/vowel unit.

6. The system of claim 4, wherein, in response to a determination that the setting mode is the prefix index of the syllable unit, the recommended word indexer module is configured to index the at least one converted word according to the prefix of the syllable unit.

7. The system of claim 4, wherein, in response to a determination that the setting mode is the suffix index of the syllable unit, the recommended word indexer module is configured to index the at least one converted word according to the suffix of the syllable unit.

8. The system of claim 4, wherein the query autocompletion server comprises a mode converter module configured to convert the setting mode according to the selection information.

9. The system of claim 3, wherein the query autocompletion server is configured to extract the at least one autocomplete recommended word from the recommended word index database using the setting mode.

10. The system of claim 2, wherein the web server is configured to transmit the at least one autocomplete recommended word and the query the web browser.

11. The system of claim 2, wherein the web browser comprises a validation determination module configured to determine whether the query is identical to a query currently inputted in the web browser, and to output the at least one autocomplete recommended word in response to a determination that the query is identical to the query currently inputted in the web browser.

12. The system of claim 2, wherein, in response to input of the query via the web browser, the web server is configured to provide the web browser with the at least one autocomplete recommended word in substantially real time.

13. The system of claim 2, wherein the web server is configured to provide a different display of an autocomplete recommended word that satisfies a determined standard, from the at least one first recommended word list.

14. The system of claim 13, wherein the determined standard comprises at least one of the at least one autocomplete recommended word being identical to the query, and a content retrieval or a shortcut associated with the at least one autocomplete recommended word exists.

15. The system of claim 1, wherein the recommended word indexer module comprises:
   a converter module configured to convert the at least one first word in the at least one first recommended word list to the at least one converted word; and
   an indexer module configured to index the at least one converted word based on at least one of a prefix of the consonant/vowel unit, a prefix of the syllable unit, and a suffix of the syllable unit.

16. The system of claim 1, wherein the recommended word indexer module is configured to index at least one second recommended word list, the at least one second recommended word list comprising words in the second language and being stored in the recommended word index database according to at least one of a prefix of the consonant/vowel unit, a prefix of the syllable unit, and a suffix of the syllable unit, and wherein the recommended word index database is configured to store the indexed at least one second recommended word list.

17. The system of claim 1, wherein the at least one first recommended word list further comprises a search frequency for each at least one word, is arranged in an order of highest search frequency, and is stored in the recommended word index database.

18. The system of claim 17, wherein the query autocompletion server is configured to determine a number of autocomplete recommended words from the at least one first recommended word list in the order of highest search frequency.

19. The system of claim 1, wherein the at least one first recommended word list is arranged in alphabetical order, and wherein the query autocompletion server is configured to determine a number of autocomplete recommended words from the at least one first recommended word in alphabetical order.

20. A method of providing an autocomplete recommended word, the method comprising:

storing at least one first recommended word list in a recommended word database, the at least one first recommended word list comprising at least one word in a first language;

converting, by a processor, at least one first word in the at least one first recommended word list to at least one converted word, and indexing the at least one converted word according to at least one index unit, the at least one index unit comprising at least one of a consonant/vowel unit and a syllable unit, wherein the at least one converted word comprises a pronunciation in the first language of the at least one first word spelled using a second language different from the first language and the at least one index unit comprises a pronunciation of the at least one consonant/vowel unit and syllable unit spelled using the second language;

storing the at least one converted word in association with the at least one index unit; and receiving, by the processor, a setting mode and a query comprising a subject index unit comprising one of the at least one index unit, determining at least one autocomplete recommended word, and transmitting the at least one autocomplete recommended word to a web browser, wherein the at least one autocomplete recommended word comprises at least one first word that corresponds to at least one converted word that is indexed according to the subject index unit;

wherein the at least one converted word has a different meaning in the second language than the at least one word in the first language.

21. The method of claim 20, wherein the setting mode comprises selection information about at least one of a prefix index of the consonant/vowel unit, a prefix index of the syllable unit, and a suffix index of the syllable unit, and wherein determining the at least one autocomplete recommended word comprises determining the at least one autocomplete recommended word from a recommended word index database using the selected index.

22. The method of claim 21, wherein indexing the at least one converted word comprises indexing the at least one converted word according to the prefix of the consonant/vowel unit, in response to a determination that the setting mode is the prefix index of the consonant/vowel unit.

23. The method of claim 21, wherein indexing the at least one converted word comprises indexing the at least one converted word according to the prefix of the syllable unit, in response to a determination that the setting mode is the prefix index of the syllable unit.

24. The method of claim 21, wherein indexing the at least one converted word comprises indexing the at least one converted word according to the suffix of the syllable unit, in response to a determination that the setting mode is the suffix index of the syllable unit.

25. A non-transitory computer-readable medium comprising an executable program which, when executed by a processor, performs the steps of:

storing at least one first recommended word list in a recommended word database, the at least one first recommended word list comprising at least one word in a first language;

converting at least one first word in the at least one first recommended word list to at least one converted word, and indexing the at least one converted word according to at least one index unit, the at least one index unit comprising at least one of a consonant/vowel unit and a syllable unit, wherein the at least one converted word comprises a pronunciation in the first language of the at least one first word spelled using a second language different from the first language and the at least one index unit comprises a pronunciation of the at least one consonant/vowel unit and syllable unit spelled using the second language;

storing the at least one converted word in association with the at least one index unit; and receiving a setting mode and a query comprising a subject index unit comprising one of the at least one index unit, determining at least one autocomplete recommended word, and transmitting the at least one autocomplete recommended word to a web browser, wherein the at least one autocomplete recommended word comprises at least one first word that corresponds to at least one converted word that is indexed according to the subject index unit;

wherein the at least one converted word has a different meaning in the second language than the at least one word in the first language.

* * * * *